United States Patent
Dwyer

Patent Number: 5,816,911
Date of Patent: Oct. 6, 1998

[54] JUMP RING ON GRAIN SEPARATING CONCAVE

[75] Inventor: Sushil V. Dwyer, Arkansas City, Kans.

[73] Assignee: Deere & Company, Molene, Ill.

[21] Appl. No.: 777,235

[22] Filed: Dec. 30, 1996

[51] Int. Cl.⁶ .................................................. A01F 12/20
[52] U.S. Cl. ................................ 460/71; 460/80; 460/82; 460/110
[58] Field of Search ................................. 460/71, 69, 72, 460/81, 82, 108, 109, 110, 119, 150, 901, 902, 903, 80

[56] References Cited

U.S. PATENT DOCUMENTS

| | | |
|---|---|---|
| 4,004,404 | 1/1977 | Rowland-Hill et al. ............. 460/110 X |
| 4,078,571 | 3/1978 | Todd et al. ............................ 460/81 X |
| 4,422,463 | 12/1983 | West ...................................... 460/71 X |
| 4,489,733 | 12/1984 | Underwood . |
| 4,535,787 | 8/1985 | Underwood . |
| 4,957,467 | 9/1990 | Zachary ................................. 460/81 X |

*Primary Examiner*—Terry Lee Melius
*Attorney, Agent, or Firm*—James E. Bradley

[57] ABSTRACT

A grain combine with an improved threshing cage surface achieves greater separation efficiency without increasing the length of the threshing section. The invention utilizes rings mounted to the interior surface of a perforated screen. The rings are transversely secured to a helical vane which is used to guide the crop material rearwardly through the threshing section. The rings interrupt the grain sliding rearward by forcing the grain to bounce over the rings. Since the grain does not penetrate the straw when it bounces over the rings, this invention creates greater separation by decreasing the velocity of the grain so that it may pass more easily through the perforations in the screen. The rings also agitate the grain that is mixed with the straw to allow the grain to penetrate outward toward the perforations in the screen.

8 Claims, 2 Drawing Sheets

JUMP RING ON GRAIN SEPARATING CONCAVE

FIELD OF THE INVENTION

The invention relates generally to crop threshing combines. More specifically, the invention relates to grain agitation devices in the threshing assembly of grain combines.

DESCRIPTION OF THE PRIOR ART

The threshing section of a bi-rotor grain combine comprises a threshing rotor which rotates inside a rotating threshing cage with a perforated screen through which grain escapes from the threshing cage. A helical vane is mounted to the interior surface of the threshing cage screen to urge the grain and straw in a rearward direction.

An important factor in evaluating the efficiency of a threshing section is separation loss. Separation loss is the fraction of grain which is not separated from the straw in the threshing section or the sieve section. In the prior art, this problem is solved by increasing the length of the threshing section and the other grain separating sections.

Unfortunately, increasing the length of the threshing section leads to diminishing returns with respect to separation loss. As the grain and straw move rearward in the threshing section, they continue to accelerate axially while the centrifugal force on them remains the same. Thus, as the length of the threshing section increases, the axial velocity of the grain and straw increases. As a result, when the grain passes over the smooth perforated screen in the threshing cage, the centrifugal force on the grain is unable to force the faster moving grain through the holes in the screen. In designs of this nature, the grain may be threshed more efficiently if it is separated toward the front of the threshing section before it develops excessive axial velocity.

Another prior art combine threshing cage does not use a perforated screen, rather, it incorporates wires and bars to provide better threshing surfaces.

DISCLOSURE OF THE INVENTION

In this invention, a grain combine with an improved threshing cage surface is provided. This improved threshing cage will result in greater separation efficiency without increasing the length of the threshing section and its attendant costs, such as greater combine size, power consumption, and increased losses due to the velocity of the grain through the threshing section. The invention utilizes at least one ring which is mounted to the interior surface of the perforated screen. The rings are perpendicular to the rotational axis and transverse to the helical vane which is used to guide the material rearwardly through the threshing section.

The rings have a radial dimension which is high enough to decrease the velocity of or interrupt the grain sliding rearward, and thereby force the grain to bounce up and over the rings to slow the axial velocity of the grain through the threshing section. However, the rings, being shorter in height than the vanes, do not significantly decrease the axial velocity of the straw as it travels rearward through the threshing section. Since the grain does not penetrate the straw when it bounces over the rings, this invention creates greater separation by decreasing the velocity of the grain so that it may pass more easily through the perforations in the screen.

DETAILED DESCRIPTION

Figure 1:
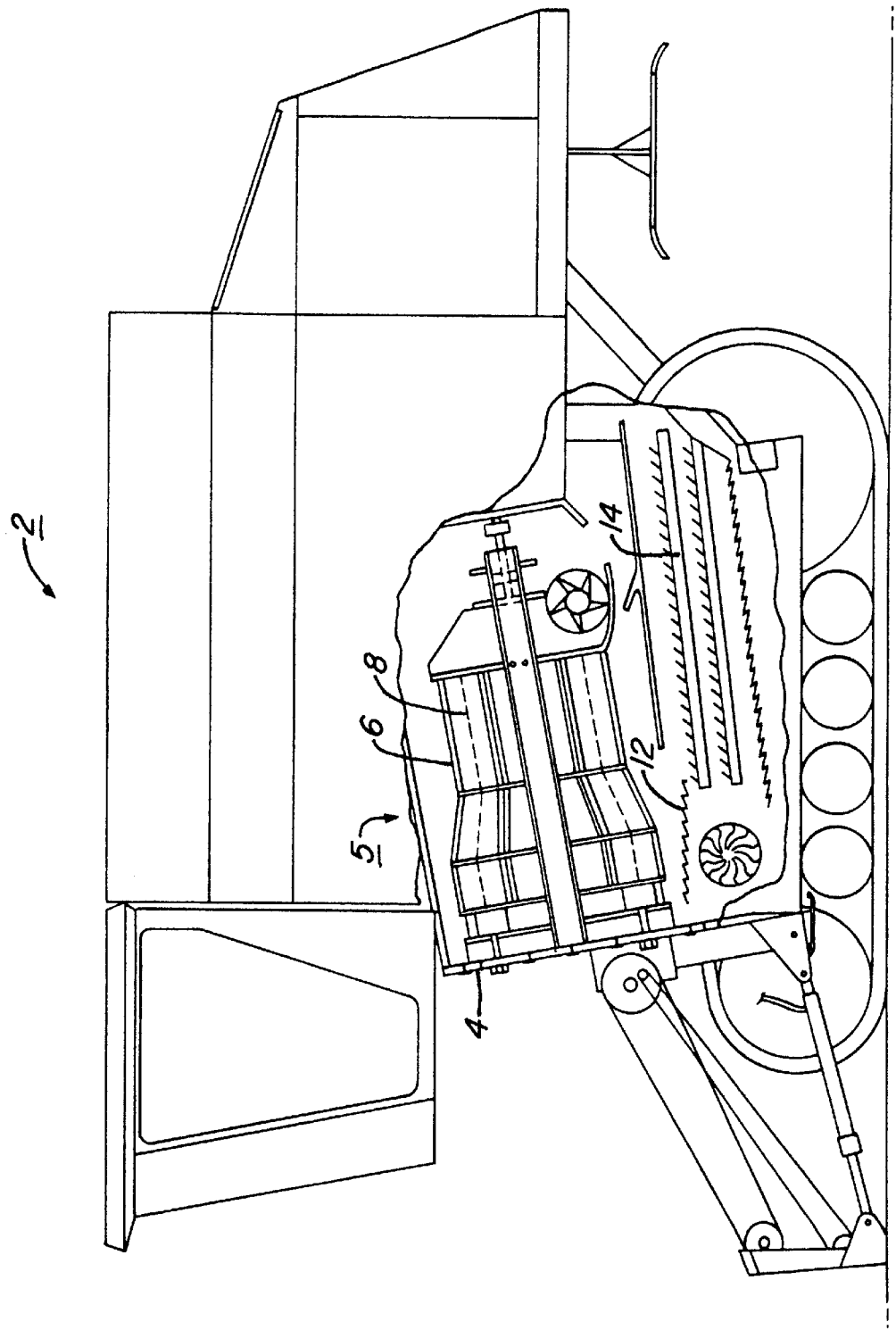
FIG. 1 is a schematic drawing of a grain combine demonstrating the relative positions of the various components which comprise the invention.
Figure 2:
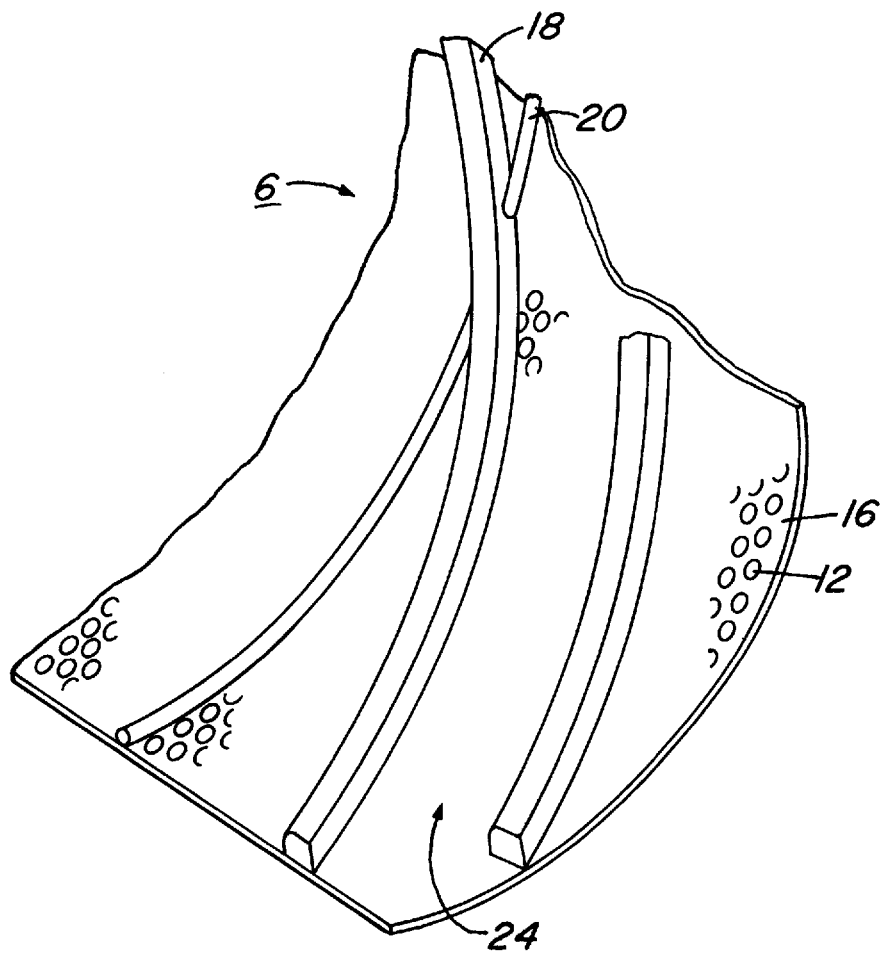
FIG. 2 is a perspective, partially sectioned view of a portion of the interior of the threshing cage.

Referring to FIG. 1, a grain combine 2 has a front plate 4, and a threshing section 5. Threshing section 5 comprises a rotating threshing cage 6 and a threshing rotor 8 which rotates inside of and relative to threshing cage 6. Referring to FIG. 2, threshing cage 6 comprises a generally cylindrical housing having a perforated screen 16. At least one helical vane 18 and a plurality of interrupter rings 20 are located inside cage 6. Vane 18 and interrupter rings 20 are rigidly mounted to one another and to an interior surface of screen 16. Interrupter rings 20 are axially spaced apart along screen 16 and are substantially parallel to one another. Interrupter rings 20 are significantly shorter in radial height than vane 18. Interrupter rings 20 are perpendicular to the axis of rotation of cage 6 and intersect vane 18. Each interrupter ring 20 has rib-like segments between adjacent coils of vane 18. In the preferred embodiment, vane 18 is composed of UHMW plastic and press fit into threshing cage 6. Rings 20 are composed of steel, welded to threshing cage 6, and extend through holes in vane 18.

As threshing cage 6 rotates, vane 18 urges the grain and straw to slide along the interior surface of screen 16 in a rearward direction by causing them to flow in channels 24 located between consecutive arcs of vane 18. The grain is forced out of threshing cage 6 through perforations 22 in screen 16. The grain then falls onto a ripple pan 12 and a sieve section 14 as the straw continues to move rearward in channels 24 toward the rearward end of grain combine 2.

The interrupter rings 20 slow the smooth flow and axial velocity of the grain along the interior surface of screen 16. As the straw and grain pass over interrupter rings 20 in channels 24, the grain bounces up and over interrupter rings 20, thereby decreasing the velocity of the grain while agitating the grain trapped within the flowing straw. Interrupter rings 20, however, do not significantly impede the flow of straw. By decreasing the velocity of the grain, the grain is able to escape through perforations 22 with improved efficiency.

The invention has several advantages. With prior art devices, the speed of the combine and its rate of crop acceptance may be limited by the speed at which the grain and straw may be processed through the threshing section. The rings have the beneficial effect of agitating the grain that gets mixed in with the straw to allow the grain to penetrate outward toward the perforations in the screen. This agitation further increases the grain separation efficiency of the combine. Thus, by utilizing rings which decrease the velocity of the threshed grain, the invention improves the efficiency of the threshing and separating process without increasing the length of the threshing section.

While the invention has been shown in only one of its forms, it should be apparent to those skilled in the art that it is not so limited, but is susceptible to various changes without departing from the scope of the invention.

I claim:

1. A threshing cage for a grain combine having a threshing rotor which rotates about a longitudinal axis within the threshing cage for threshing grain from crop, the threshing cage comprising:

a rotatable housing having a screen portion containing perforations for the grain to pass through;

a helical vane rigidly mounted to and circumscribing an inner surface of the housing for directing the crop and the grain to flow in a rearward direction, the vane protruding radially inward from the inner surface of the housing; and a ring transversely mounted along and circumscribing the inner surface of the housing for interrupting and slowing the rearward flow of grain along the inner surface of the housing to enhance the passage of grain through the perforations in the screen; and wherein the ring intersects a coil of the vane along the inner surface of the housing.

2. The grain combine of claim 1, wherein the ring is substantially perpendicular to the longitudinal axis.

3. The grain combine of claim 1, wherein the ring comprises a plurality of axially spaced apart rings which are perpendicular to and coaxial with the longitudinal axis.

4. The grain combine of claim 3, wherein the rings are substantially parallel to one another and have a radial height which is smaller than a radial height of the vane.

5. In a grain combine having a threshing cage, a threshing rotor within the threshing cage for threshing grain from crop, and a longitudinal axis about which the threshing cage and the threshing rotor rotate, the improvement comprising:

a housing having a screen portion containing perforations for the grain to pass through;

a helical vane rigidly mounted to an inner surface of the housing, the vane protruding radially inward from the housing and directing the crop and the grain to flow in a rearward direction; and a plurality of axially spaced apart ribs mounted along the inner surface of the housing perpendicular to and coaxial with the longitudinal axis for interrupting and slowing the rearward flow of grain along the inner surface of the housing to enhance the passage of grain through the perforations in the screen; and wherein the ribs intersect coils of the vane along the inner surface of the housing.

6. The grain combine of claim 5, wherein said at least one rib comprises a plurality of axially spaced apart ribs, the ribs being substantially parallel to one another.

7. The grain combine of claim 5, wherein each of the ribs has a radial height which is smaller than a radial height of the vane.

8. A grain combine, comprising in combination:

a threshing cage which contains perforations and which rotates about a longitudinal axis;

a threshing rotor within the threshing cage for threshing grain from crop, the threshing rotor rotating about the longitudinal axis at a different speed than the threshing cage;

a helical vane rigidly mounted to an inner surface of the cage, the vane protruding radially inward from the cage and directing the crop and the grain to flow in a rearward direction; and a plurality of axially spaced apart ribs mounted to the inner surface of the cage substantially perpendicular to and coaxial with the longitudinal axis, the ribs and coils of the vane intersecting each other, the ribs having a radial height which is smaller than a radial height of the vane for interrupting and slowing the rearward flow of grain along the inner surface of the cage.

* * * * *